March 14, 1933.     R. V. D. FIRTH     1,900,924
OILING DEVICE FOR BEARINGS
Filed April 22, 1930     2 Sheets-Sheet 1

INVENTOR.
Rowland V. D. Firth.
BY
HIS ATTORNEY.

March 14, 1933.  R. V. D. FIRTH  1,900,924
OILING DEVICE FOR BEARINGS
Filed April 22, 1930   2 Sheets-Sheet 2
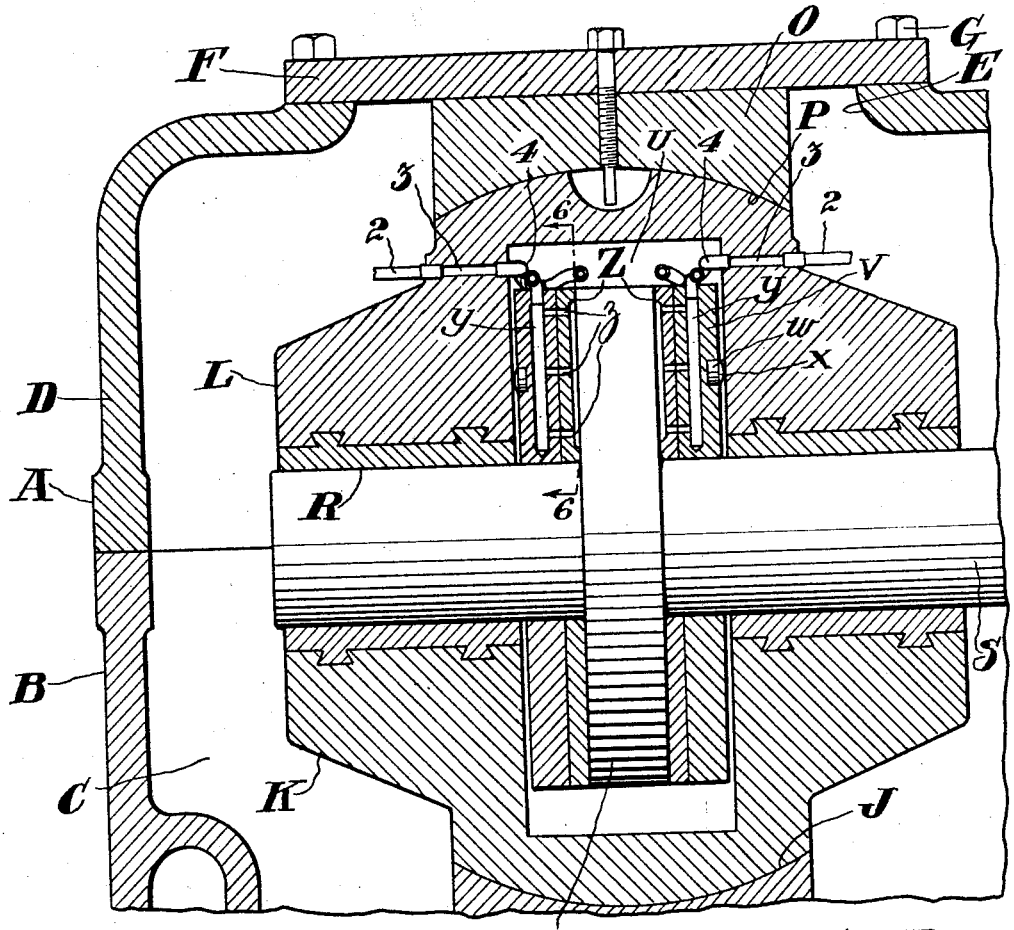
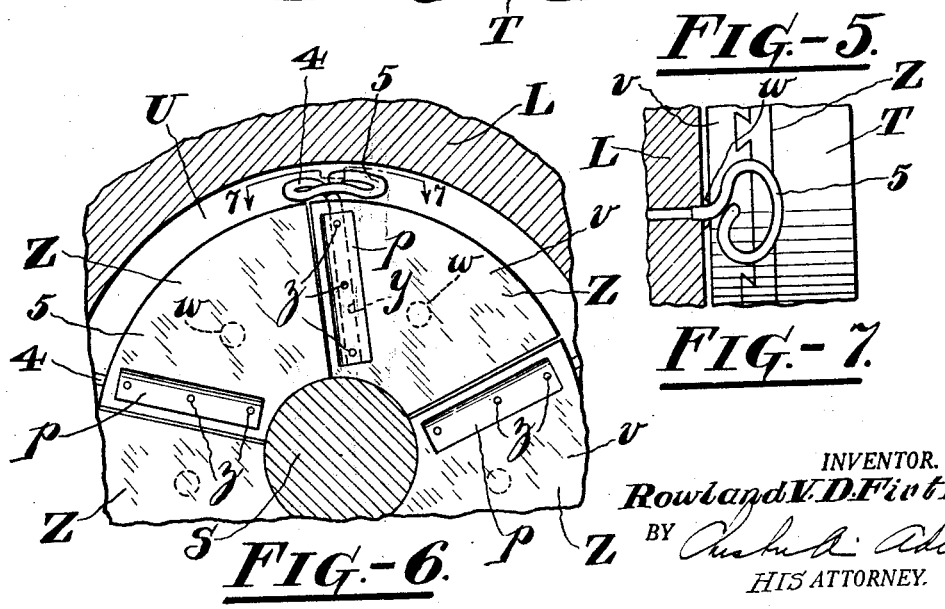
INVENTOR.
Rowland V. D. Firth
BY
HIS ATTORNEY.

Patented Mar. 14, 1933

1,900,924

UNITED STATES PATENT OFFICE

ROWLAND V. D. FIRTH, OF EASTON, PENNSYLVANIA, ASSIGNOR TO INGERSOLL-RAND COMPANY, OF JERSEY CITY, NEW JERSEY, A CORPORATION OF NEW JERSEY

OILING DEVICE FOR BEARINGS

Application filed April 22, 1930. Serial No. 446,285.

This invention relates to bearings, but more particularly to an oiling device for thrust bearings.

One object of the invention is to assure an ample and positive supply of lubricant to the cooperative surfaces of a thrust bearing and a shaft journaled therein.

Other objects will be in part obvious and in part pointed out hereinafter.

Figure 1:
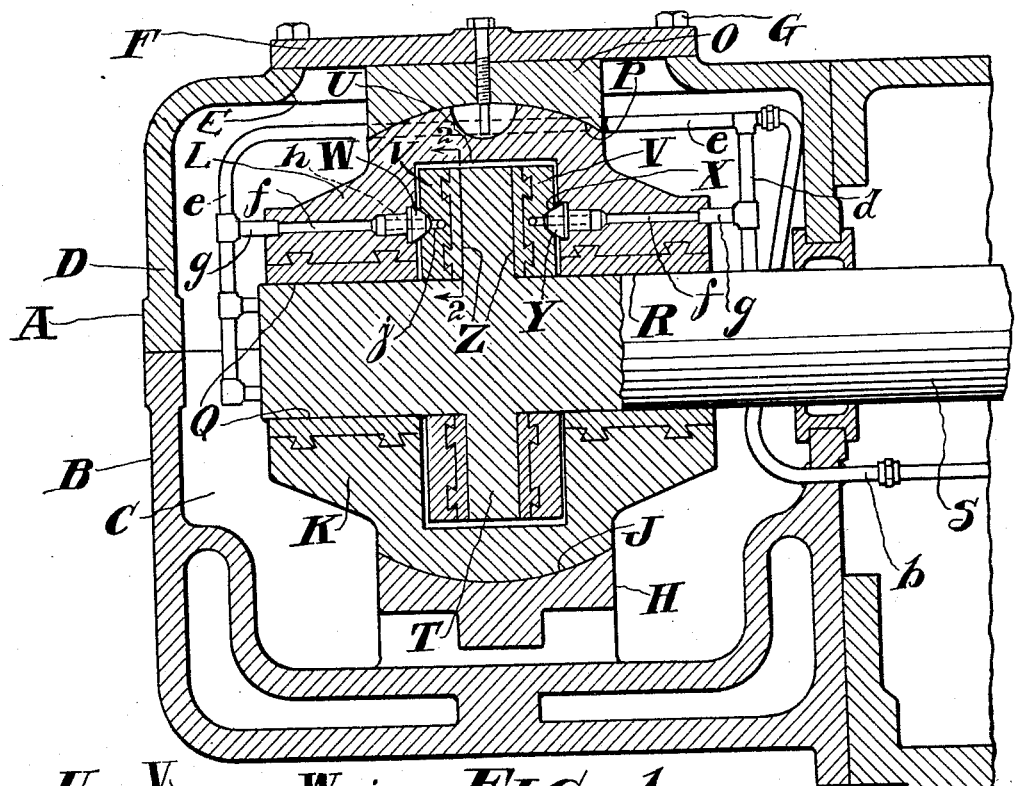
Figures 2, 3:
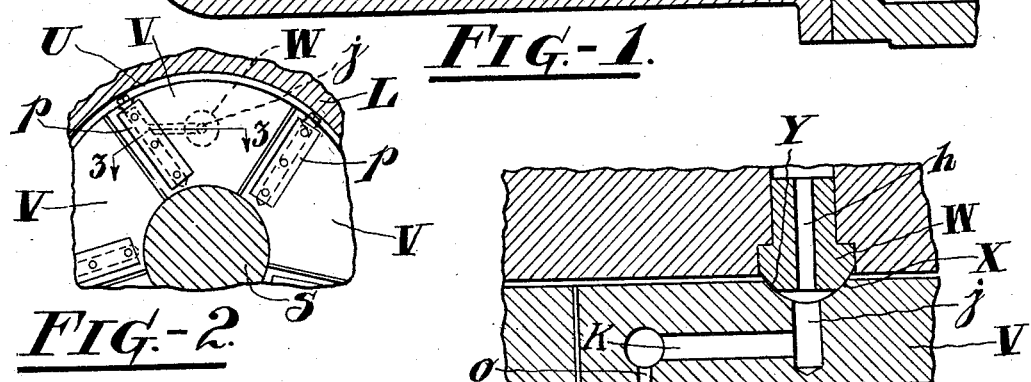
Figure 4:
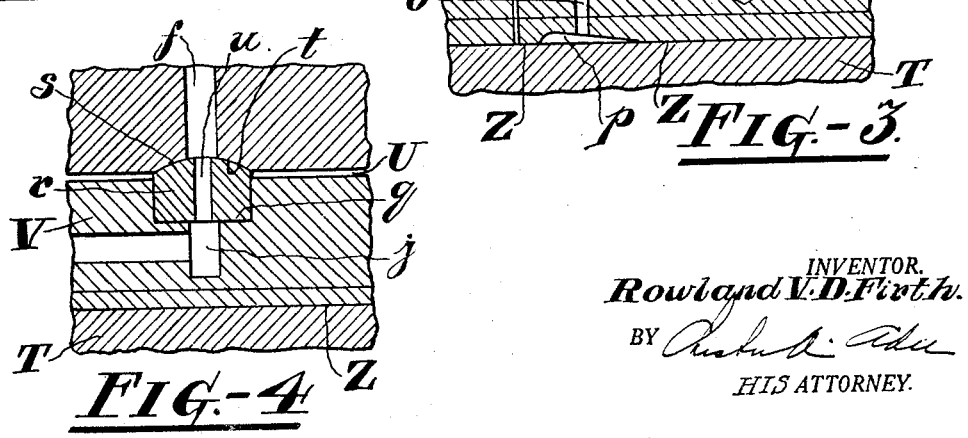

In the drawings accompanying the specification and in which similar reference characters refer to similar parts, Figure 1 is a sectional elevation of a thrust bearing equipped with an oiling device constructed in accordance with the practice of the invention, Figure 2 is a transverse view taken through Figure 1 on the line 2—2 looking in the direction indicated by the arrows, and showing the oil grooves in the thrust shoes, Figure 3 is a plan view in section taken through Figure 2 on the line 3—3 looking in the direction indicated by the arrows and showing the manner in which the oil may be conveyed through the thrust shoes to lubricate the bearing surfaces thereof, Figure 4 is a view similar to Figure 3 showing a modified form of the invention, Figure 5 is a sectional elevation of a thrust shoe showing still another modified form of the invention, Figure 6 is a transverse view taken through Figure 5 on the line 6—6 looking in the direction indicated by the arrows, and Figure 7 is a plan view, partly in section, taken through Figure 6 on the line 7—7 looking in the direction indicated by the arrows.

Referring to the drawings, and at first more particularly to the form of the invention illustrated in Figures 1, 2 and 3, A designates generally a thrust bearing comprising a housing B, the interior of which forms a reservoir C for oil. A cap D may be secured to the housing B in any suitable manner, and in the upper end of the cap D is an opening E which may be normally closed by a cover plate F secured to the cap D as by means of bolts G.

Formed integrally with the housing B and arranged therein is a support H having a spherical surface J which forms a seating surface for a thrust bearing in the form of lower and upper blocks K and L respectively. Likewise, on the cover plate F is a support O which may be secured to the cover plate in any convenient manner and, like the support H, has a spherical bearing surface P to accommodate the block L.

The blocks K and L may be secured together in any suitable and convenient manner and said blocks are provided with semi-circular recesses Q which are adapted to register with each other to form a bore R for a shaft S which may be connected to a suitable prime mover (not shown) to effect rotation thereof.

On the portion of the shaft S which lies within the confines of the bearing blocks K and L is a flange T which extends into a chamber U in the bearing blocks. The chamber U is of suitable proportions to accommodate the usual thrust shoes, such as those designated by V, whereby the end thrust of the shaft S may be suitably equalized over the different portions of the bearing blocks K and L.

The thrust shoes V are preferably held in the operative position by means of thrust buttons W which are seated in the blocks K and L and are provided with convex surfaces X which extend into correspondingly formed depressions Y in the outer surface of the thrust shoes V to hold said thrust shoes in suitable spaced relation with respect to the ends of the chamber U. In this way the thrust shoes V will, upon the application of a thrust thereagainst by the flange T, be able to readily adjust themselves about radial axes of oscillation and in which axes the thrust buttons W are preferably disposed.

In accordance with the present invention, means are provided to assure an ample supply of lubricant under pressure to the bearing surface Z of the thrust shoes V and the cooperating surfaces of the flange T. To this end the bearing is provided with a supply conduit $b$ which may lead from a source of oil under pressure, as for instance, an oil pump (not shown). The conduit $b$ is connected to a pipe $c$ having branch pipes $d$ and $e$ leading to the rear and front ends respectively of the bearing. In the ends of the bearing blocks are supply passages $f$ into which oil is introduced by pipes $g$ connected to the pipes $d$ and $e$ and extending in this instance into the outer ends of the passages $f$.

The passages $f$ are in constant communication with passages $h$ formed in this instance in the thrust buttons W and communicating with passages $j$ in the thrust shoes V. From the passages $j$ lead branch passages $k$ preferably extending parallel to the bearing surface Z in a direction counter to the direction of rotation of the flange T. The branch passages $k$ communicate with the bearing surface Z of the thrust shoes V through restricted ports $o$, also in the thrust shoes V and located adjacent the end toward which the passages $k$ extend.

In order to assure a suitable film of oil across the entire bearing surfaces Z of the thrust shoes, said thrust shoes are provided with radially extending grooves $p$ located in the bearing surfaces to form small pockets or reservoirs which may be constantly maintained full of oil. Preferably the grooves $p$ are arranged in the ends of the thrust shoes V and the ports $o$ open into these grooves. The grooves are preferably wedge-shaped in cross section with the end nearest the center of each shoe V blending into the bearing surface Z so that immediately upon the starting of the shaft S, the oil present in the grooves $p$ will be evenly and uniformly distributed across the bearing surfaces Z by the rotation of the flange T thereover.

The above described device has been found to function in an unusually efficient manner. This is due to the fact that it enables the oil to be applied directly to the cooperating surfaces of the thrust shoes and the flange T under pressure and at suitable points on the thrust shoes V to assure a constant film of oil between these elements and the flange T.

In the modification shown in Figure 4, the thrust shoes V, only one of which is shown for illustrative purposes, are provided with recesses $q$ to snugly receive thrust buttons $r$ having convex surfaces $s$ on the ends projecting from the recesses $q$ to seat in convex sockets $t$ in the blocks K and L, that is, in the end surface of the chamber U. The thrust buttons $r$ have passages $u$ to convey oil from the supply passages $f$ to the passage $j$ and the associated passages leading to the grooves $p$ in the bearing surfaces of the thrust shoes V.

The surfaces $s$ of the thrust buttons $r$, like the surfaces X of the preferred modification, cooperate closely with the surfaces of the depressions into which they seat to form a substantial seal at this point, thus preventing the leakage of oil and a consequent reduction in the pressure of the oil supply system.

In the modification illustrated in Figures 5 to 7 inclusive, the thrust bearings are provided with thrust shoes $v$ which are held in spaced relation with respect to the ends of the chamber U by means of thrust buttons $w$ which are seated in the thrust shoes V and have rounded or convex surfaces $x$ to seat against the end surfaces of the chamber U.

In the present instance the thrust shoes $v$ are provided with supply passages $y$ which open from the outer edges of the thrust shoes and extend downwardly in the direction of the shaft S to points near the inner edges or ends of the thrust shoes. In the thrust shoes $v$ are lateral passages $z$ which lead from the passage $y$ and open into the grooves $p$ formed in the bearing surface Z of the thrust shoes $v$. The oil intended to be supplied to the grooves $p$ may be conveyed to the bearing blocks K and L by conduits 2 which open into the outer ends of passages 3 in the blocks K and L.

From the opposite or inner ends of the passages 3 lead flexible conduits 4 which are connected with one end to the blocks K and L to extend into the passage 3 and are connected with their other ends to the supply passages $y$. Preferably the conduits 4 are provided with a coil or coils 5 to render them flexible and thus prevent said conduits from injury due to flexion incident to the movement of the thrust shoes. The ends of the conduits 2 and 4 may be fixedly secured in the ends of the passages which they connect, such as those designated by 3 and $y$ so that suitable fluid tight joints may be assured between the flexible conduits and the elements to which they are connected.

I claim:

1. In combination with a rotatable member, a thrust bearing having a supply passage for oil, thrust shoes in the bearing having bearing surfaces thereon, oil passages in the thrust shoes extending substantially parallel to the bearing surfaces in a direction counter to the direction of rotation of said member and opening at one end of said shoes, radially extending grooves in said end of the thrust shoes to receive oil from the oil passages, said grooves being wedge-shaped in cross section with the end nearest the center of the shoe blending into the bearing surface, and thrust buttons interposed between the bearing and the thrust shoes to permit oscillating movement of the thrust shoes relatively to the bearing and having passages to convey oil from the supply passage to the oil passages.

2. In combination with a rotatable member, a thrust bearing having a supply passage for oil, thrust shoes therein having bearing surfaces, oil passages in the thrust shoes extending substantially parallel to the bearing surfaces in a direction counter to the direction of rotation of said member and opening at one end of said shoes to deliver lubricant to the bearing surfaces, and thrust buttons interposed between the bearing and the thrust shoes to permit oscillating movement of the thrust shoes relative to the bearing, said thrust buttons having passages to convey oil from the supply passage to the oil passages.

In testimony whereof I have signed this specification.

ROWLAND V. D. FIRTH.